United States Patent [19]
Takahashi et al.

[11] Patent Number: 5,666,345
[45] Date of Patent: Sep. 9, 1997

[54] OPTICAL MEMORY MEDIUM WITH PREDETERMINED GUIDE TRACKS AND PREPITS

[75] Inventors: Akira Takahashi; Tetsuya Inui, both of Nara; Kenji Ohta, Nara-ken; Toshihisa Deguchi; Kazuo Van, both of Nara, all of Japan

[73] Assignee: Sharp Kabushiki Kaisha, Osaka, Japan

[21] Appl. No.: 203,619

[22] Filed: Feb. 28, 1994

Related U.S. Application Data

[63] Continuation of Ser. No. 740,670, Aug. 2, 1991, abandoned, which is a continuation of Ser. No. 239,755, Sep. 2, 1988, abandoned.

[30] Foreign Application Priority Data

Sep. 2, 1987 [JP] Japan ................................ 62-219708

[51] Int. Cl.$^6$ ................................................ G11B 7/24
[52] U.S. Cl. ........................ 369/275.1; 369/275.4; 369/277
[58] Field of Search ................. 369/275.1, 275.5, 369/109, 111, 284, 286, 272

[56] References Cited

U.S. PATENT DOCUMENTS

| | | | |
|---|---|---|---|
| 4,587,648 | 5/1986 | Ando | 369/275.1 |
| 4,707,816 | 11/1987 | Yonezawa et al. | 369/46 |

FOREIGN PATENT DOCUMENTS

| | | | |
|---|---|---|---|
| 0100995 | 2/1984 | European Pat. Off. | 369/275 |
| 0164131 | 12/1985 | European Pat. Off. | |
| 0189948 | 8/1986 | European Pat. Off. | |
| 3620331 | 6/1986 | Germany | |
| 58-41446 | 3/1983 | Japan | 369/109 |
| 61-13458 | 6/1984 | Japan | |
| 61-151843 | 2/1986 | Japan | |
| 0178116 | 4/1986 | Japan | 369/275.1 |
| 61-126635 | 6/1986 | Japan | |
| 61-129741 | 6/1986 | Japan | |
| 61-214246 | 9/1986 | Japan | 369/109 |

OTHER PUBLICATIONS

Jan H.T. Pasman, et al., Developments in Optical Disk Mastering, 62/SPIE vol. 529 Optical Mss Data Storage (1985).

*Primary Examiner*—Hoa T. Nguyen

[57] ABSTRACT

An optical memory disc medium contains a plurality of guide groove tracks. The guide groove tracks are arranged parallel to each other and they are used for controlling a position of a light beam. There is a land region between the guide groove tracks which is wider than the width of the guide groove tracks as measured in the disc-radial direction. Prepits for providing address information for the guide groove tracks are provided. The prepits are formed on the land regions and interposed between the lateral edges in the disc-radial direction of adjacent parallel guide groove tracks. Each prepit has a width which width is a narrower dimension than the width of each guide groove track as measured in the disc-radial direction.

15 Claims, 10 Drawing Sheets

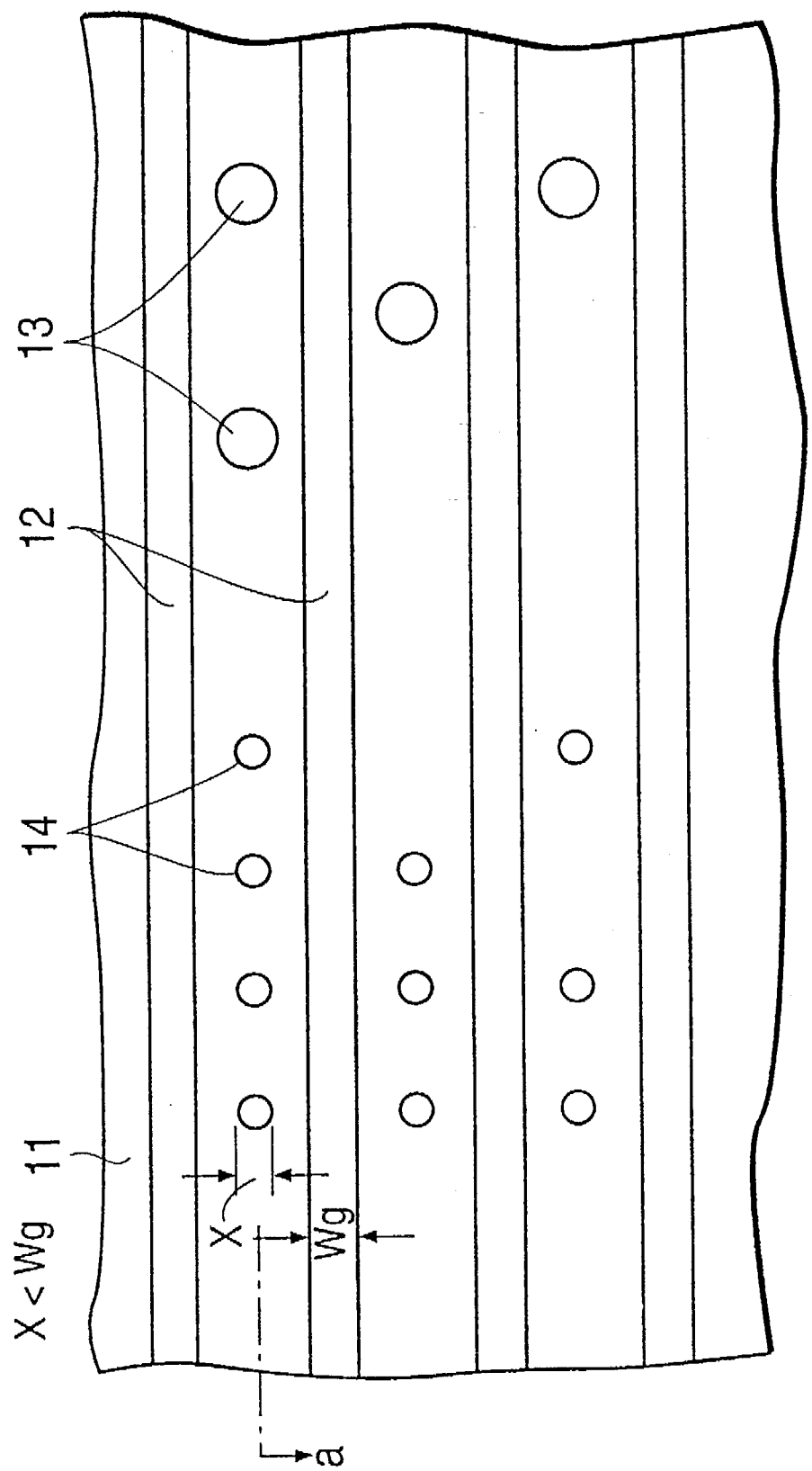

OPTICAL MEMORY MEDIUM WITH PREDETERMINED GUIDE TRACKS AND PREPITS

This application is a continuation, of application Ser. No. 07/740,670 filed Aug. 2, 1991, which was a continuation of application Ser. No. 07/239,755, filed Sep. 2, 1988, both now abandoned.

BACKGROUND OF THE INVENTION

1. Field of the Invention

This invention relates to an optical memory medium with which information can be optically recorded and reproduced or erased. More particularly, it relates to an improvement for an a preformat of optical memory medium.

2. Description of the Prior Art

In recent years, the development of information processing systems large capacity has created a demand for inexpensive memories. To meet this demand, various optical memory systems have been developed. Among such optical memory systems, three kinds of systems have been used.

The first one is a system which only reproduces information. In this system, fine pit patterns are formed in a row on a recording element so that information can be reproduced by utilizing the diffraction phenomenon of an incident laser beam in the pit patterns.

The second system is of a so-called write once type in which a laser beam is applied to a recording medium to form portions. The reflectivity of the medium is changed, and the change in the reflectivity is detected by applying a laser beam, to read the recorded information. In this system, hence, information can be additionally recorded by a user.

The third system employs a magneto-optic disk in which information can be recorded, and erased by a user (i.e., information is rewritable). A magneto-optic disk used in this system has a magnetic thin film with an axis of easy magnetization perpendicular to the surface of the film. A portion of the magnetic thin film irradiated by a laser beam is heated to decrease the coercive force of the film. In the irradiated portion, the magnetic domains are oriented in accordance with the direction of the external magnetic field applied to the film thereby the recording and erasing the information. Information is reproduced based on the magneto-optic effect while a weak laser beam is irradiated to the portion in which information has been recorded.

In an optical disk used in such a system, "recording tracks", having a width of about 1 μm store the information. If a laser spot is deviated from the objective recording track or applied to a recording track other than the objective track, information cannot be correctly recorded or reproduced. When recording or reproducing information, therefore, the position of a final focused laser spot should be precisely controlled so as not to deviate from the objective recording track, thereby necessitating a servo control system which uses guiding tracks of any kind.

An optical disk (e.g., a so-called compact disk) used in the aforementioned optical system which only reproduces of information includes row-formed pit patterns corresponding to information to be recorded and which are formed in the manufacturing process of the disk. In such an optical disk, therefore, the rows (recording tracks) composed of the pit patterns can be used as guiding tracks so that a laser spot can be servo-controlled to trace one of the rows.

In an optical disk of a write once type or rewritable type, information is recorded into regions no information has been prerecorded. In order to accurately guide the laser spot to a predetermined position (i.e., a predetermined recording track) of the disk, guide tracks and addresses indicating a track number or address are preformed on a glass or resin substrate of the disk in the manufacturing process of the disk. Hereinafter, the term "optical disk" is used to indicate an optical disk in which information can be recorded after the production of the disk, such as those of a write once type or a rewritable type, including a magneto-optic disk.

Generally, guide tracks in the form of grooves are intermittently or continuously formed along in a circumferential direction on a substrate of an optical disk, and address information is recorded in the form of pits along the grooves. Some methods of preforming the guide tracks and pits have been proposed. For example, a method in which an Ni stamper is employed to transcribe the grooves and pits onto a resin substrate made of acrylic resin or polycarbonate resin by an injection molding technique, and a method in which UV-setting resin is interposed between a stamper having grooves and pits and a substrate made of glass or acrylic resin, and the interposed resin is then exposed to UV rays (this method called "the 2P method"). Another proposed method uses a glass substrate, on which a laser beam or UV rays are selectively irradiated through a photo mask onto a photoresist layer, and then an etching is done to form simultaneously grooves and pits.

The guide tracks are V-shaped, U-shaped or Ω-shaped in cross sectional view, and are formed into a spiral or concentric circles on the optical disks. Each of the guide tracks is provided with information of a track number or address, called prepit. The prepits and the guide tracks are named, together, to be a preformat. Preformats include a groove-type preformat (FIG. 6) in which data bits 3 are disposed on guide tracks 1 and prepits 2 are disposed in an area, in which there is no guide track 1, extending from one end of a guide track section to the other end thereof. A land-type preformat (FIG. 7) has data bits 3 and prepits 2 disposed on a land positioned between the adjacent guide tracks 1. If the optical disk is of a magneto-optic type, the data bits 3 represent portions in which the direction of magnetization is reversed to store information.

The shape of each of the guide tracks 1 is determined so that tracking error signals can be distinctly obtained from the guide tracks 1 when the the optical beam position deviates. The shape of each of the prepits 2 is determined so that a signal that identifies the track number can be distinctly output.

Accordingly, there is usually a difference between the optimum size of the prepits 2 and the optimum size of the guide tracks 1.

With the above-mentioned groove-type preformat, the position of an optical disk on which the prepits 2 are formed is a position on which the guide track 1 is not formed, so that the tracking error signals from the guide tracks 1 cannot be output when the laser beam is positioned in the said prepits. On the other hand, the above-mentioned land-type preformat is designed so that the guide tracks 1 pass along the position on which the prepits 2 are formed. Accordingly, the land-type format is disadvantageous in that the prepits 2 influence negatively the tracking error signals from the guide track 1 although the tracking error signals from the guide track 1 can be output.

To overcome the above-mentioned problem, the depth of the groove of each of the guide tracks is differentiated from the depth of the groove of each of the prepits 2. For example, the depth of the grooves that constitute the prepits 2 are set to be ¼ wavelength of laser light, which causes difficulties in the production of the preformat.

SUMMARY OF THE INVENTION

The preformat of optical disks of this invention, which overcomes the above-discussed and other numerous disadvantages and deficiencies of the prior art, comprises guide tracks which function to control the position on which a light beam is impinged, and prepits which correspond to information of a track address, said prepits being formed between the adjacent guide tracks, the width of each of said prepits being set narrower than that of each of said guide tracks.

In one preferred embodiment, the depth of each of said prepits is equal to that of each of said guide tracks.

In an alternative embodiment, the depth of each of said prepits is different from that of each of said guide tracks.

The invention described herein makes possible the objectives of (1) providing an optical memory medium in which tracking error signals from the guide tracks can be distinctly output without influence from the prepits even in the position of the optical memory medium on which the prepits are formed; and (2) providing an optical memory medium in which the depth of each of the prepits is not required to be ¼ times the wavelength of laser light, but can be set the same depth as that of each of the grooves of the guide tracks, which makes for easy manufacture of the preformat easy.

BRIEF DESCRIPTION OF THE DRAWINGS

The invention may be better understood and its numerous objects and advantages more apparent to those skilled in the art by reference to the accompanying drawings as follows:

FIG. 1 is a schematic diagram showing a preformat of a magneto-optic disk of the invention;

FIGS. 11a, 11b and 11c show sketch and waveforms of signals produced in the system of FIG. 10.

DESCRIPTION OF THE PREFERRED EMBODIMENTS

FIG. 1 shows a preformat of optical disks according to the invention. The optical disk 11 shown in FIG. 1 is of a magneto-optic type, and includes guide tracks 12 that contribute to control the position on which a laser beam is condensed into a spot, i.e., the optical beam position, data bits 13 that correspond to recorded information, and prepits 14 that correspond to information of a track number. The guide tracks 12 are formed into a spiral or concentric circulars on the optical disk 11. In order to ensure that a laser beam is condensed into a spot on a predetermined position, the shape of each of the guide tracks 12 is determined so that large tracking error signals can be obtained from the guide tracks 12 when a deviation of the optical beam position arises. The data bits 13 and the prepits 14 are both formed between the adjacent guide tracks 12.

An example of a system for reading recorded information from the data bits 13 of a magneto-optic disk will be described. In the magneto-optic disk system of this example, a magneto-optic recording medium disk is irradiated by a light beam of linear polarization, and changes its polarization direction corresponding to the magnetization directions of the recording medium detected as reproduced signals. More specifically, a light beam of linear polarization produced by a polarizer is incident on the recording medium of a magneto-optic disk to obtain reflected beams, the polarization direction of which varies in accordance with the magnetization direction of the recording medium, and then the reflected means are incident on an analyzer to transform the variations in the polarization direction of the reflected beams into changes in the light intensity. The obtained changes in the light intensity are converted into electric signals by a photodetector.

Figure 8:
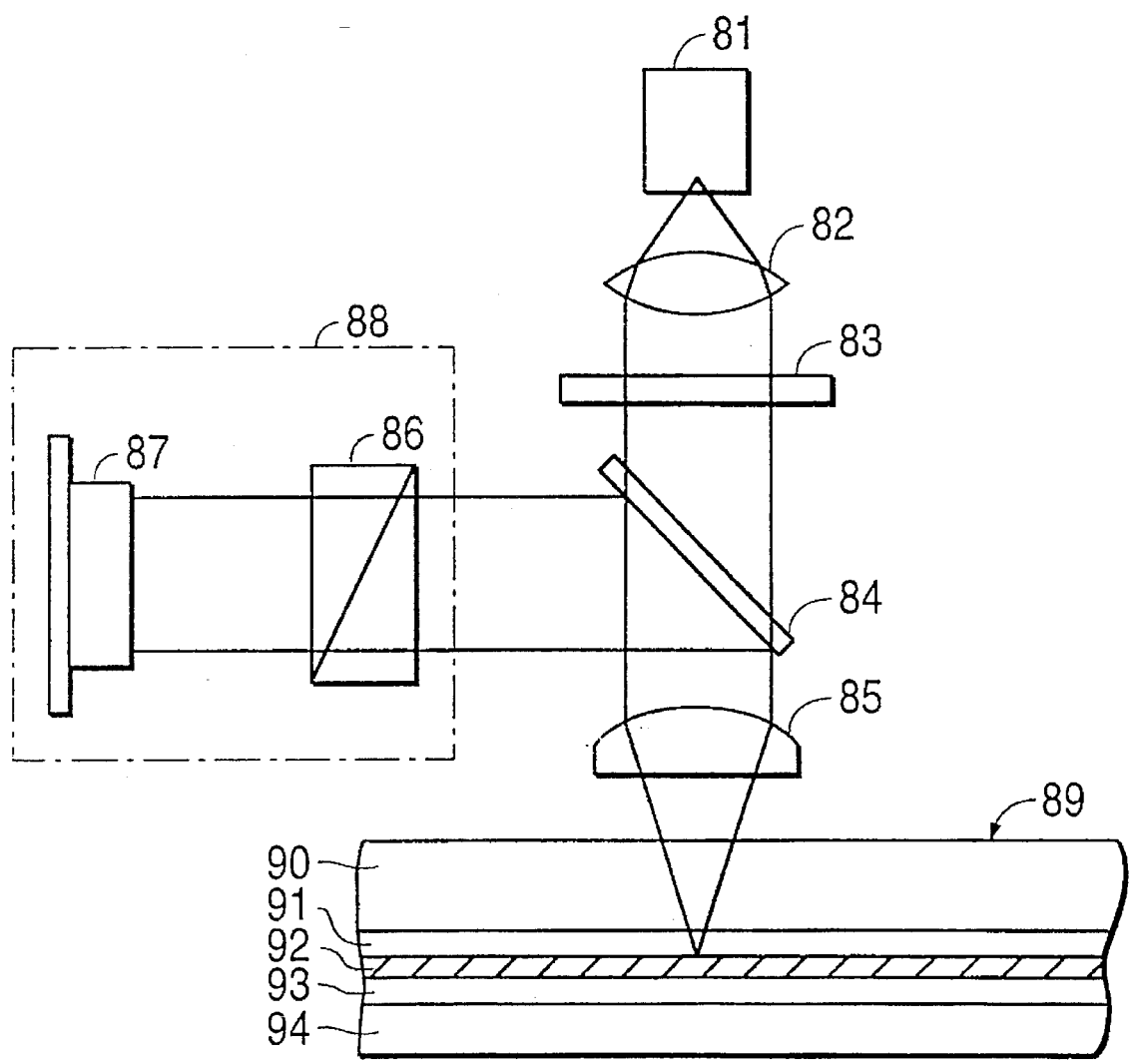
FIG. 8 is a diagram showing an optical system for reproducing signals from a magneto-optic disk.
Figure 9:
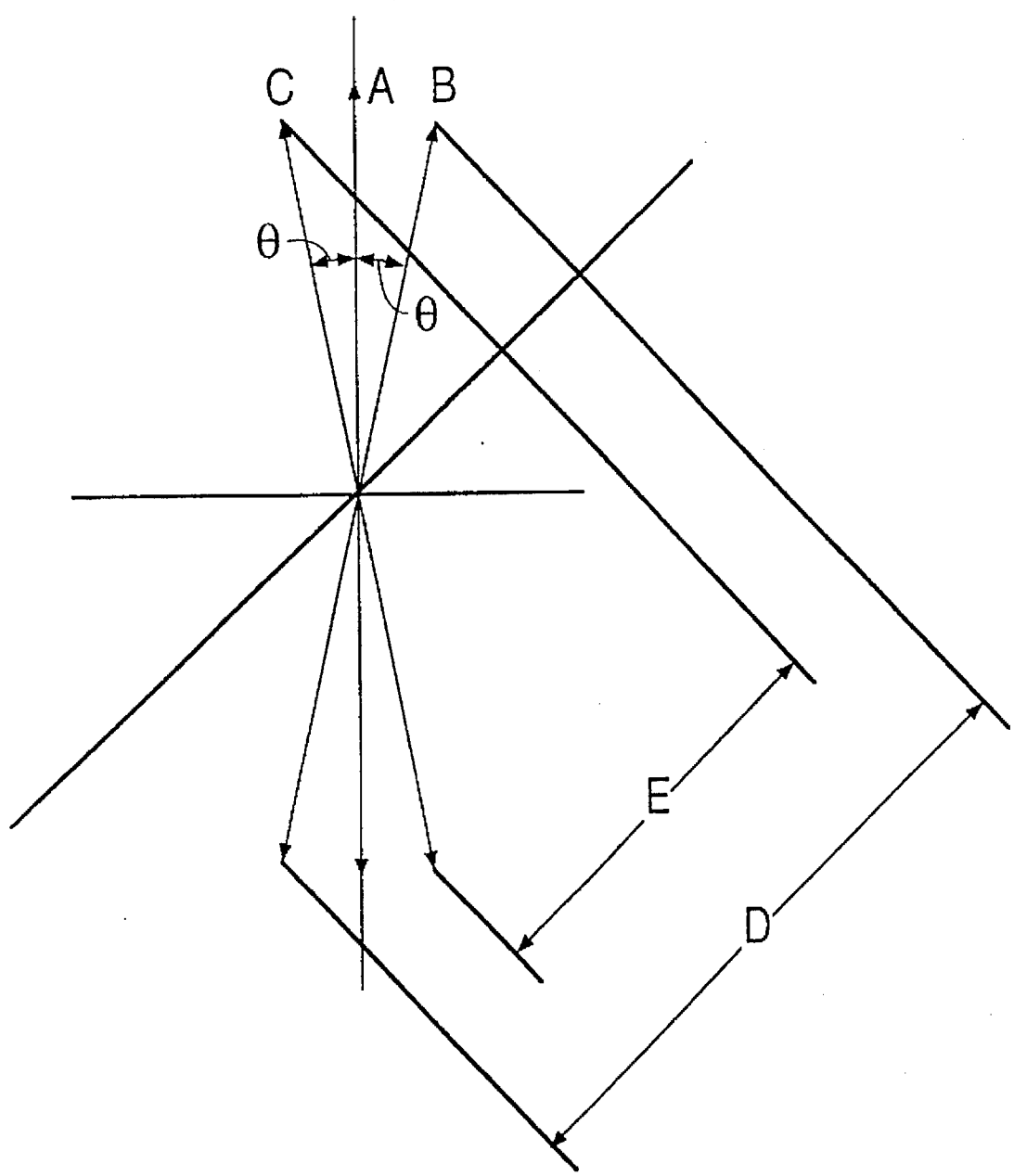
FIGS. 9 and 11a are a diagram illustrating a principle of producing signals from reflected light beams, respectively.

FIG. 8 illustrates diagrammatically an optical system for reproducing signals from a magneto-optic disk.. A magneto-optic disk 89 used in this system contains a laminated structure in which an AlN insulating layer 91, a GdTbFen amorphous magnetic thin layer 92, another AlN insulating layer 93, and a metal reflective layer 94 of Al are laminated in this sequence on a substrate 90. In the system of FIG. 8, a laser beam emitted from a semiconductor laser device 81 passes through a collimating lens 82 and a polarizer 83 to produce a beam of linear polarization having the polarization direction A as shown in FIG. 9. The beam of linear polarization is condensed by an objective lens 85 to the magneto-optic disk 89.

Figure 10:
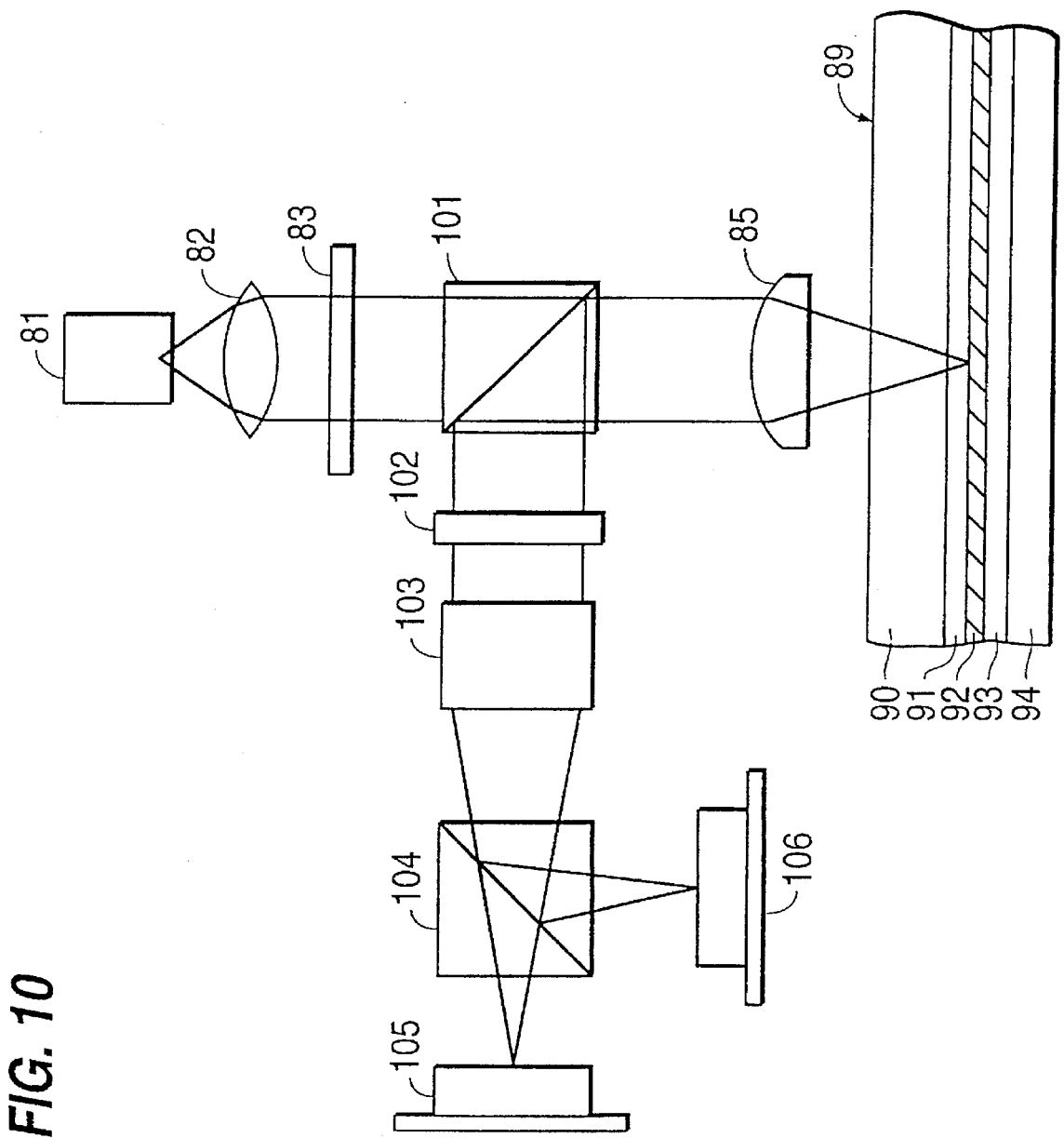
FIG. 10 is a diagram showing another optical system for reproducing signals from a magneto-optic disk.
Figure 11A:
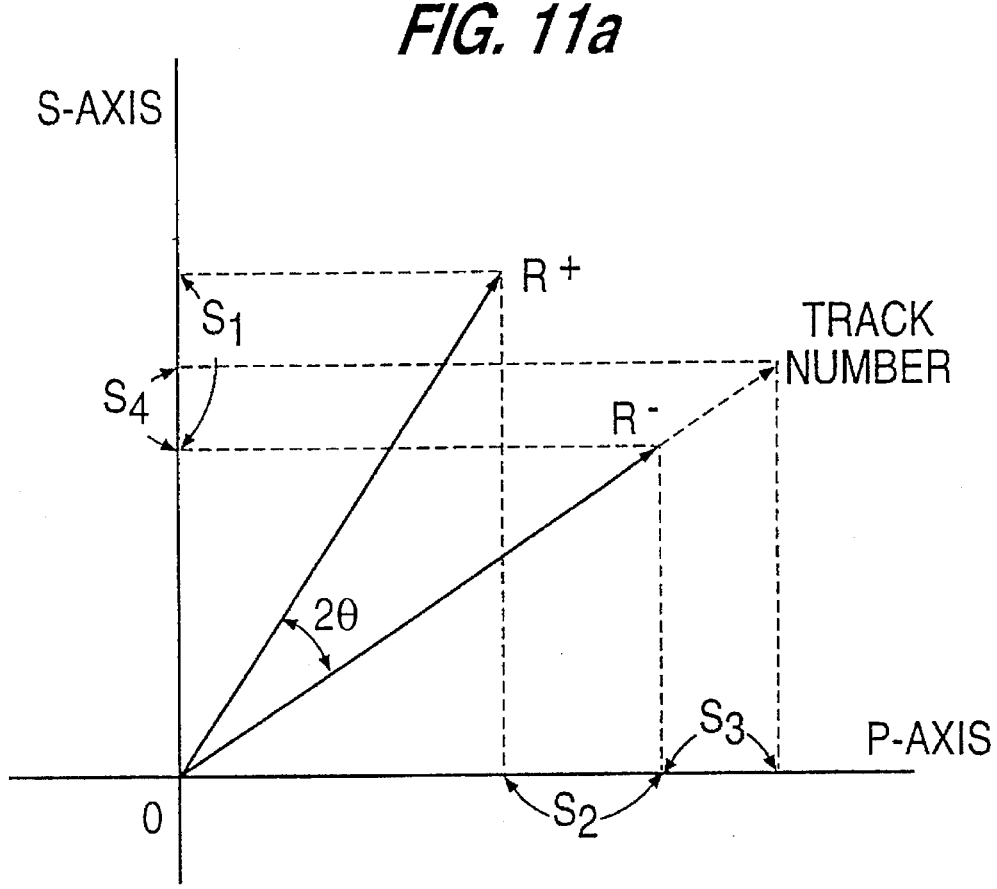
Figure 11B:
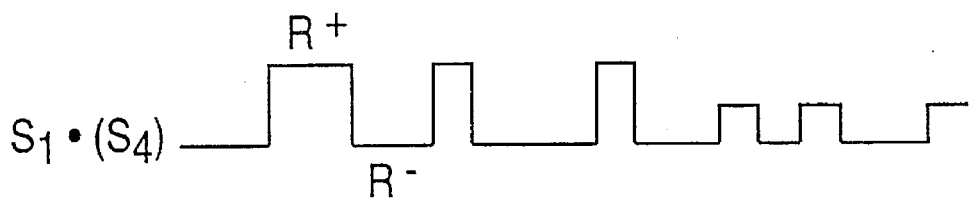
Figure 11C:
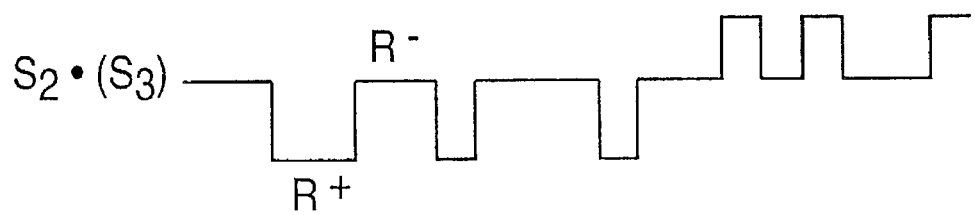

The beam of linear polarization light is condensed to the magneto-optic disk 89, and is reflected as a beam of linear polarization the polarization direction of which depends on the direction of the magnetic domain in the amorphous magnetic thin layer 92 (i.e., the polarization direction B or C shown in FIG. 9). The reflected beam is directed by a beam splitter 84 into a signal detecting optical path 88 which is perpendicular to the optical path between the laser device 81 and the disk 89. As shown in FIG. 9, the polarization direction B or C of the reflected beam is converted into the light strength D or E by an analyzer 86, the direction of which is different from that of the polarizer 83. In FIG. 9, "θ" represents the Kerr rotation angle. The beam of linear polarization thus obtained is transferred into electric signals by a photodetector 87 to reproduce the recorded information The detection of tracking signals will be described with reference to FIG. 10 and FIGS. 11A to 11C. The optical system shown in FIG. 10 comprises a beam splitter 101, a half wave plate 102, a lens 103, a polarizing beam splitter 104, a first photodetector 105, and a second photodetector 106. The oscillation directions of the beam reflected from the disk 89 are set between the S axis and the P axis of the polarizing beam splitter 104 (FIG. 11a). The output of the first photodetector 105 which receives the transmitted beam from the polarizing beam splitter 104 comprises signals $S_1$ and $S_4$ (FIG. 11b). The output of the second photodetector 106 which receives the reflected beam from the polarizing beam splitter 104 comprises signals $S_2$ and $S_3$ (FIG. 11c). The signals $S_1$ and $S_2$ correspond to the information which is magneto-optically reproduced (i.e., information obtained from the data bits 13), while the signals $S_3$ and $S_4$ correspond to the the information which is optically reproduced (i.e., information (track address) obtained from the prepits 14). The signals of recorded information can be obtained by subtracting the signals from each other, and the signals of the track address by adding the signals to each other.

The width x of each of the prepits 14 is set to be narrower than the width Wg of each of the guide tracks 12. Because of the above-mentioned structure, the prepits 14 never have a bad influence on the tracking error signals produced by the guide tracks 12 in the position of the optical disk 11 that corresponds to the position on which the prepits 14 are formed, so that the optical disk system including an optical disk with the said preformat can be accurately controlled.

Figure 2A:
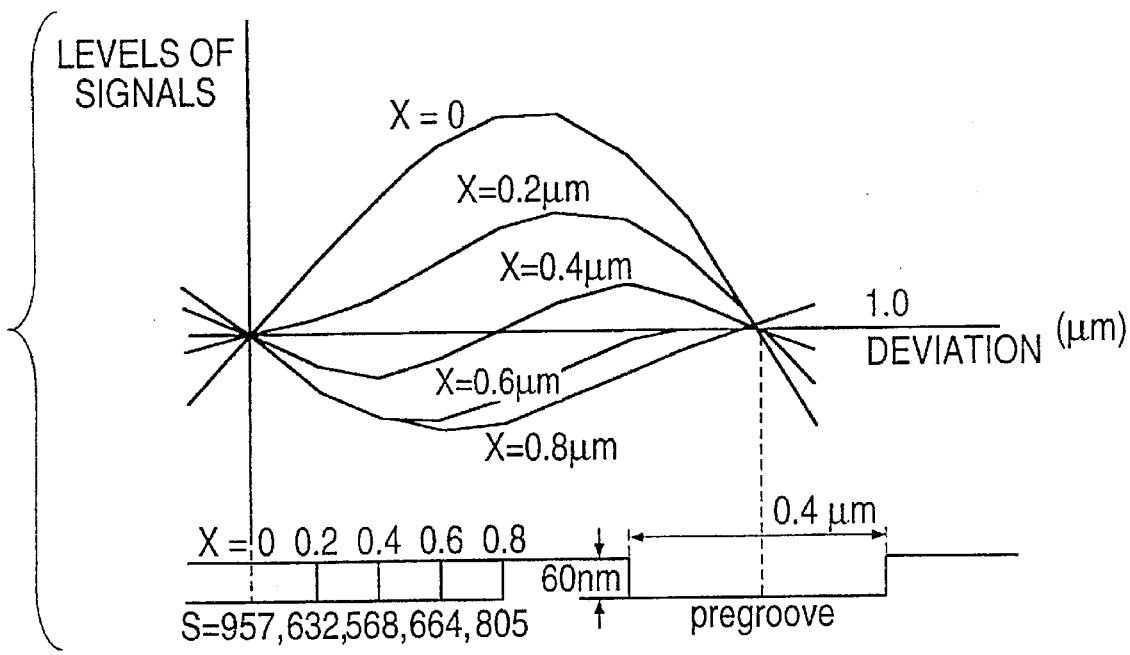
FIG. 2a represents a graph showing the characteristics of the tracking error signals from guide tracks in the cases where the width Wg and the depth of each of the guide tracks are set to be 0.4 μm and 60 nm, respectively.

In general, the tracking error signal exhibits a zero level that is the standard at the time when the spot of the laser beam is positioned at the center of the land of the optical disk 11 (namely deviation of the optical beam position does not arise). It exhibits a positive or negative level with a deviation of the optical beam position from the center of the land of the optical disk 11, and on the basis of the changes of the said level, the direction and the amount of the deviation of the optical beam position from the center of the land can be detected. A reduction of the above-mentioned characteristics of the tracking error signal can be prevented by the above-mentioned structure of the preformat of this invention so that the width x of each of the prepits 14 is set to be narrower than the width Wg of each of the guide tracks 12. The reasons therefor are described below:

FIG. 2a shows the changes (i.e., the signal levels) of the tracking error signals based on the deviation of the optical beam position from the center of the land of an optical disk where the width Wg of each of the guide tracks 12 was set at a value of 0.4 μm; the depth of each guide track 12 and each prepit 14 were both set at a value of 60 nm; the width x of each of the prepits 14 was set at values of 0 μm, 0.2 μm, 0.4 μm, 0.6 μm, and 0.8 μm. The wavelength of laser light was assumed to be 0.78 μm, the NA (numerical aperture) of an optical lens by which the laser light is condensed into a spot on the optical disk was 0.6, and the pitch of the guide tracks 12 was 1.6 μm. The tracking error signals were detected by the push-pull method with respect to a far-field pattern attained by a laser device that produces the laser light. FIG. 2a indicates that signals with positive levels are output based on deviation of the optical beam position in the direction of the arrow a (FIG. 1) from the center of the land of the optical disk 11 where the width x of the prepit 14 is 0 μm or 0.2 μm. This means that the prepits 14 with these widths do not badly influence upon the characteristics of the tracking error signals. In contrast, FIG. 2a shows that signals with negative levels or mixtures of negative and positive levels are output based on the deviation of the optical beam position in the direction of arrow a in the cases where the width x of the prepit 14 is 0.4 μm, 0.6 μm, or 0.8 μm. This means that the prepits 14 with these widths have badly influence the characteristics of tracking error signals, which makes the track servo control impossible. The reference S of FIG. 2a indicates the intensity of signals that is defined as a value of 1000 at the time when a light beam is reflected from a flat portion of the optical disk on which neither grooves nor pits are formed. For example, the value of S is 957 (i.e., S=957) when the prepits 14 are not formed (i.e., the width x of each of the prepits 14 is 0 μm), and it is 632 (i.e., S=632) when the width x of the prepit 14 is 0.2 μm. A difference, 325, between the values of 957 and 632 indicates the amplitude of signals at the time when the width x of the prepit 14 is 0.2 μm. The signals can be readily detected by an increase in the said signal amplitude, as described above. A difference, 389, between the values of 957 and 568 indicates the amplitude of signals at the time when the width x of the prepit 14 is 0.4 μm, as well.

Figure 2B:
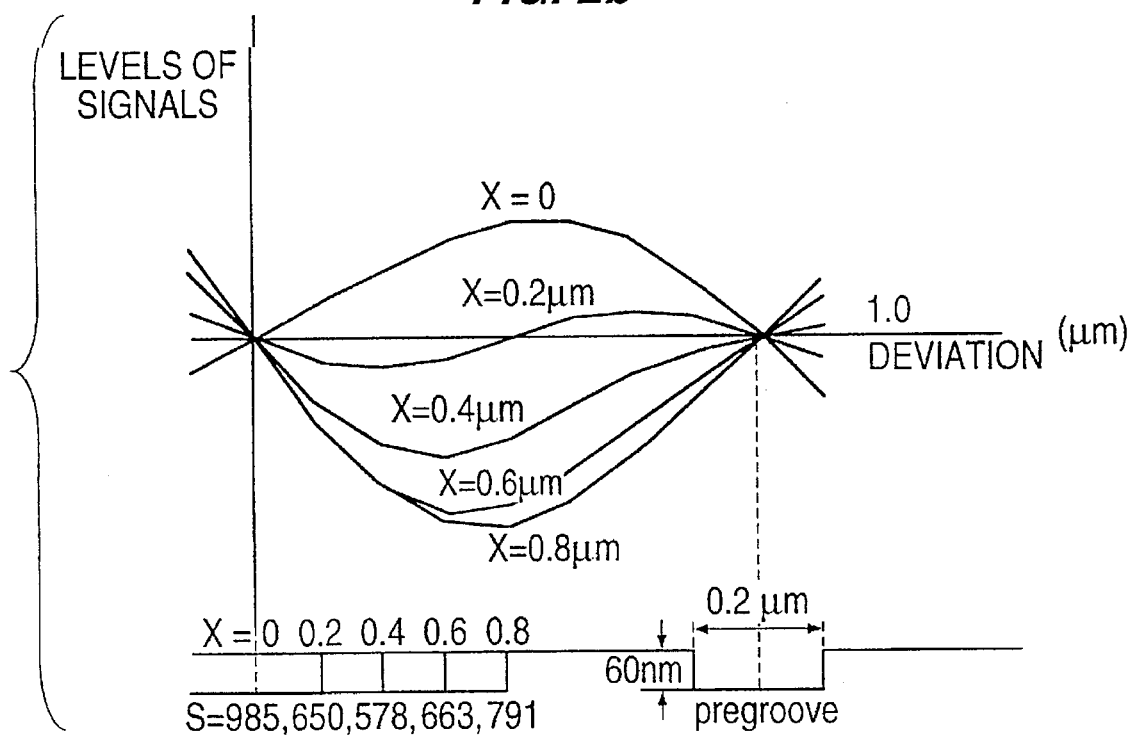
FIG. 2b represents a graph showing the characteristics of the tracking error signals from the guide tracks in the cases where the width Wg and the depth of each of the guide tracks are set to be 0.2 μm and 60 nm, respectively.

FIG. 2b shows the changes (i.e., the signal levels) of the tracking error signals based on the deviation of the optical beam position from the center of the land of the optical disk in the case where the width Wg of each of the guide tracks 12 was set at a value of 0.2 μm and the other conditions were the same as those of FIG. 2a. It can be seen from FIG. 2b that only at the time when there is no prepit 14 (i.e., the widths of the prepits 14 are 0 μm), the tracking error signals are not influenced.

Figure 3A:
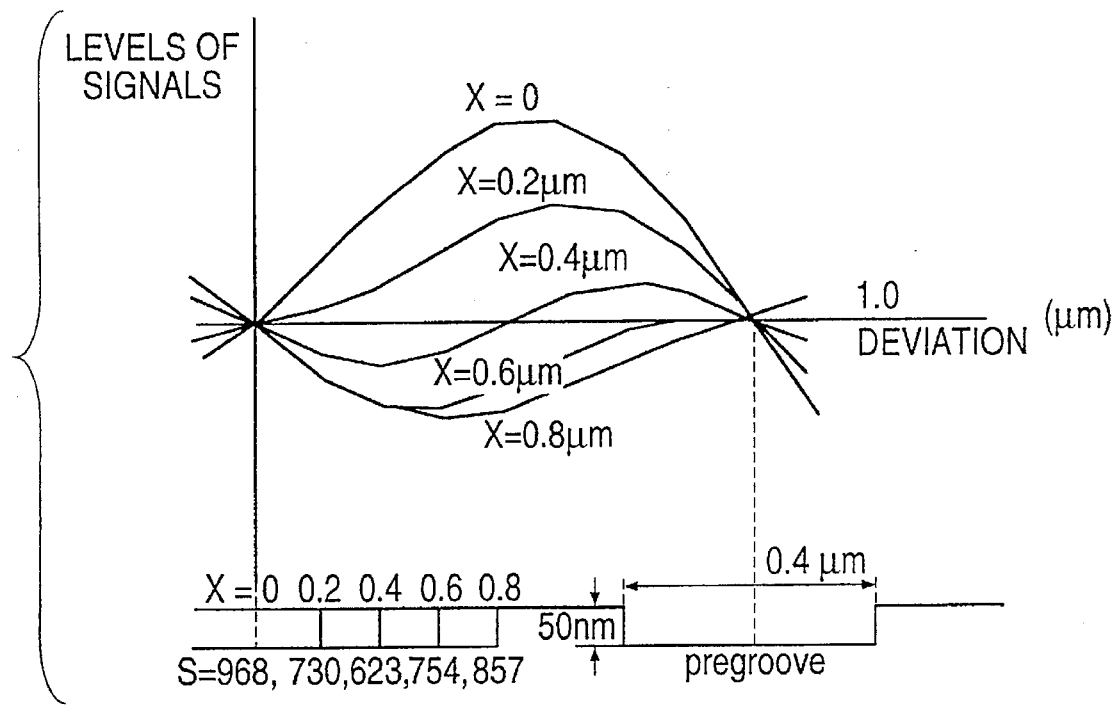
FIG. 3a represents a graph showing the characteristics of the tracking error signals from guide tracks in the cases where the width Wg and the depth of each of the guide tracks are set to be 0.4 μm and 50 nm, respectively.
Figure 3B:
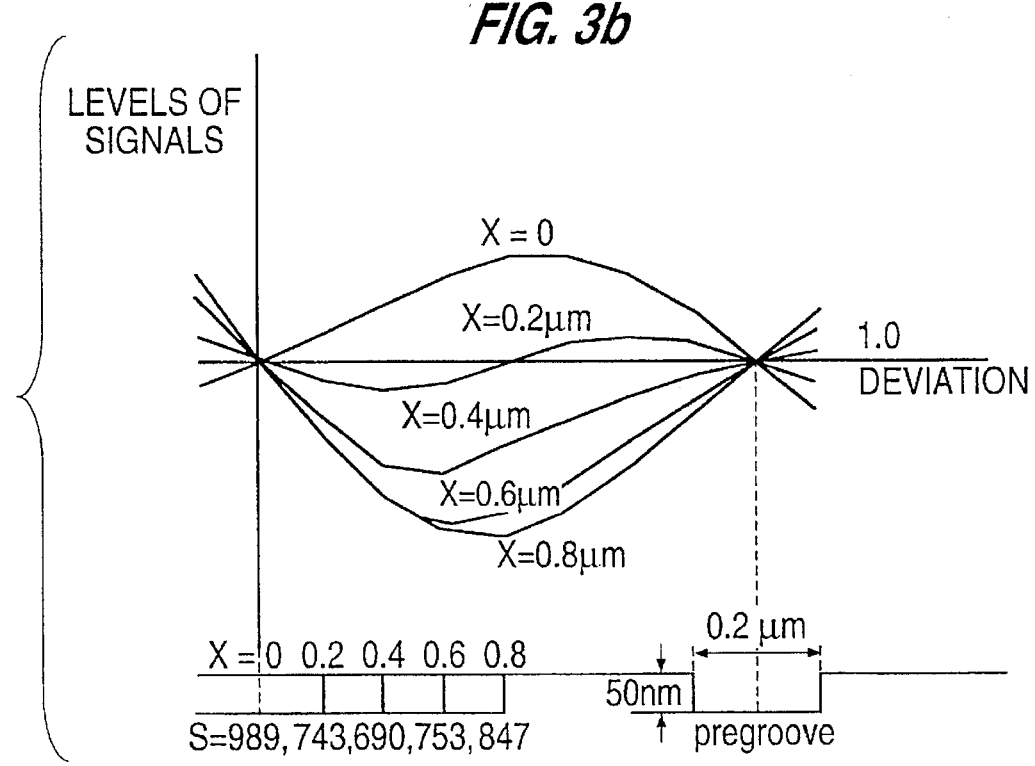
FIG. 3b represents a graph showing the characteristics of the tracking error signals from guide tracks where the width Wg and the depth of each of the guide tracks are set to be 0.2 μm and 50 nm, respectively.

FIG. 3a shows the changes of the tracking error signals where the width Wg and the depth of each of the guide tracks 12 were set to be 0.4 μm and 50 nm, respectively, and the other conditions were the same as those of FIG. 2a. FIG. 3b shows the changes of the tracking error signals where the width Wg and the depth of each of the guide tracks 12 were set to be 0.2 μm and 50 nm, respectively, and the other conditions were the same as those of FIG. 2a. FIGS. 3a and 3b indicate that the influence of the prepits 14 on the tracking error signals does not depend upon the depth of the guide track 12, but it is constant.

Figure 4A:
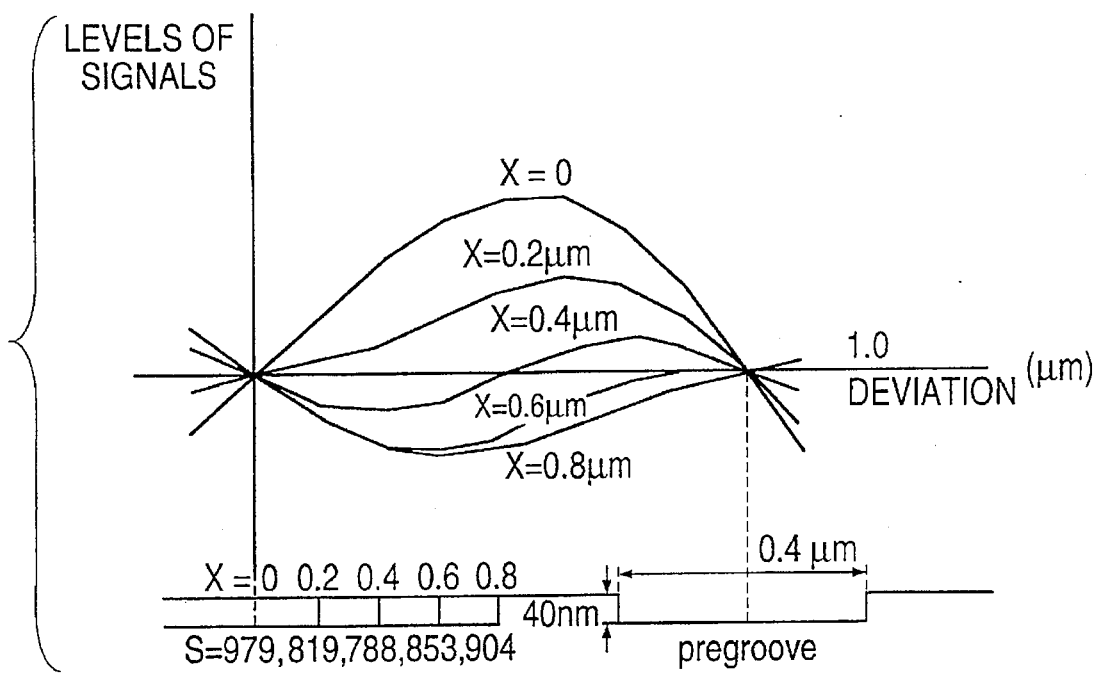
FIG. 4a represents a graph showing the characteristics of the tracking error signals from guide tracks where the width Wg and the depth of each of the guide tracks are set to be 0.4 μm and 40 nm, respectively.
Figure 4B:
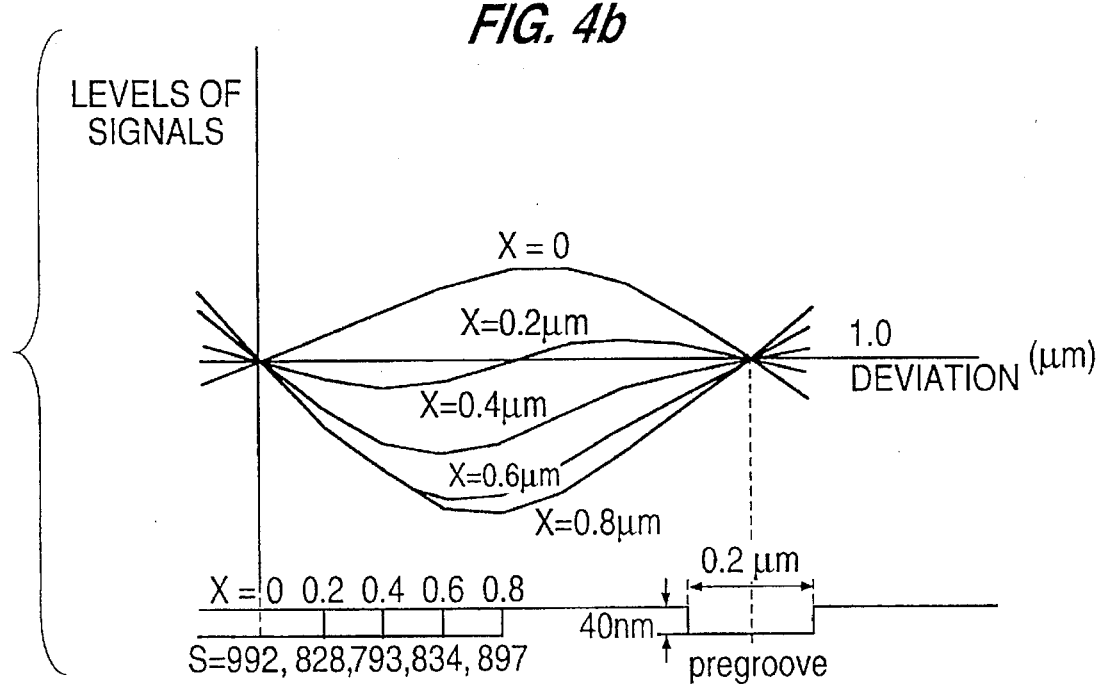
FIG. 4b represents a graph showing the characteristics of the tracking error signals from guide tracks where the width Wg and the depth of each of the guide tracks are set to be 0.2 μm and 40 nm, respectively.
Figure 5A:
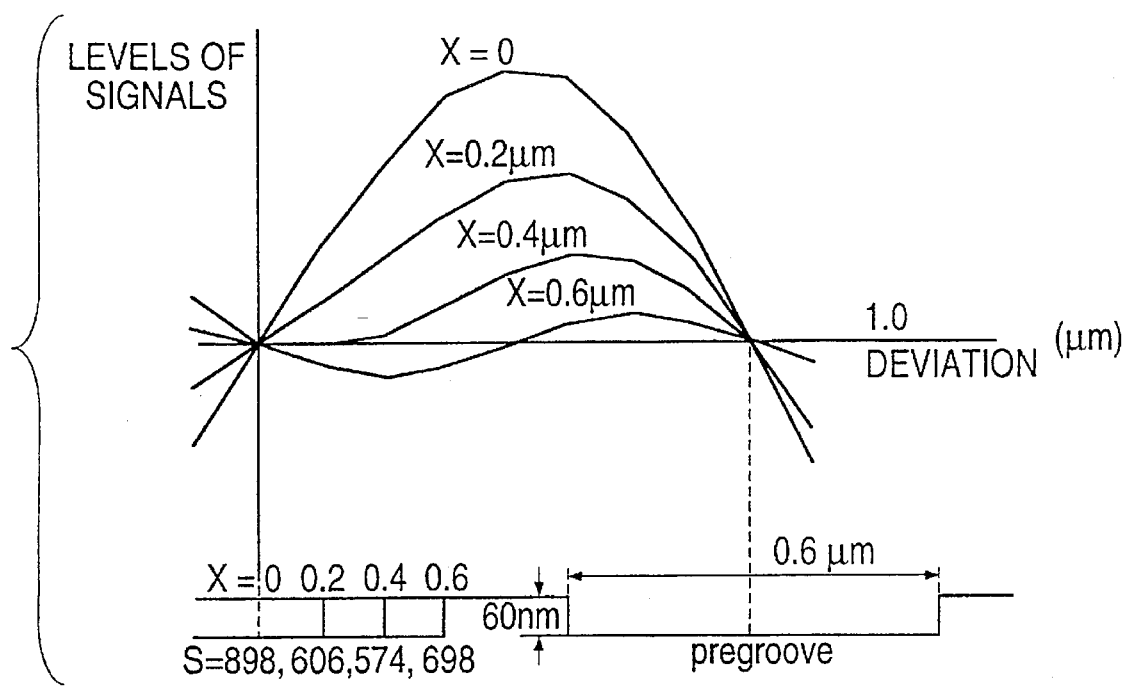
FIG. 5a represents a graph showing the characteristics of the tracking error signals from guide tracks in the cases where the width Wg and the depth of each of the guide tracks are set to be 0.6 μm and 60 nm, respectively.
Figure 5B:
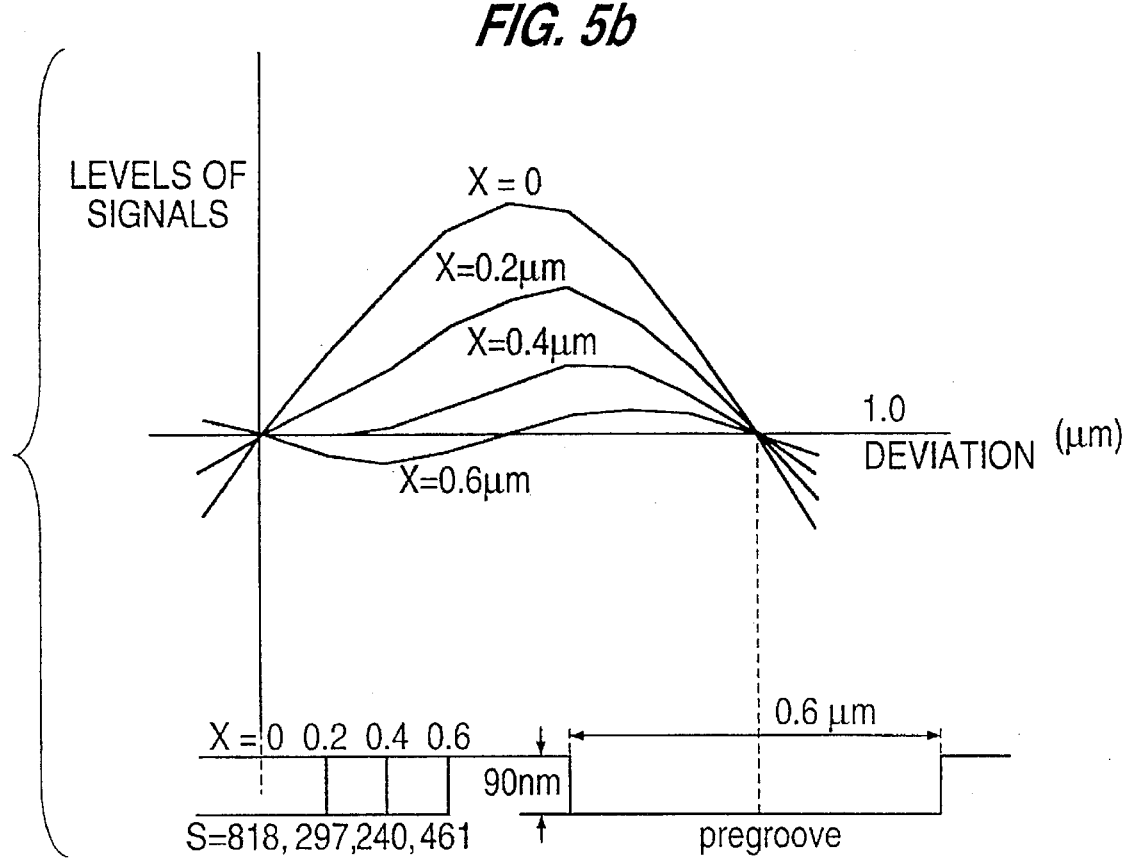
FIG. 5b represents a graph showing the characteristics of the tracking error signals from guide tracks in the cases where the width Wg and the depth of each of the guide tracks are set to be 0.6 μm and 90 nm, respectively.
Figure 6:
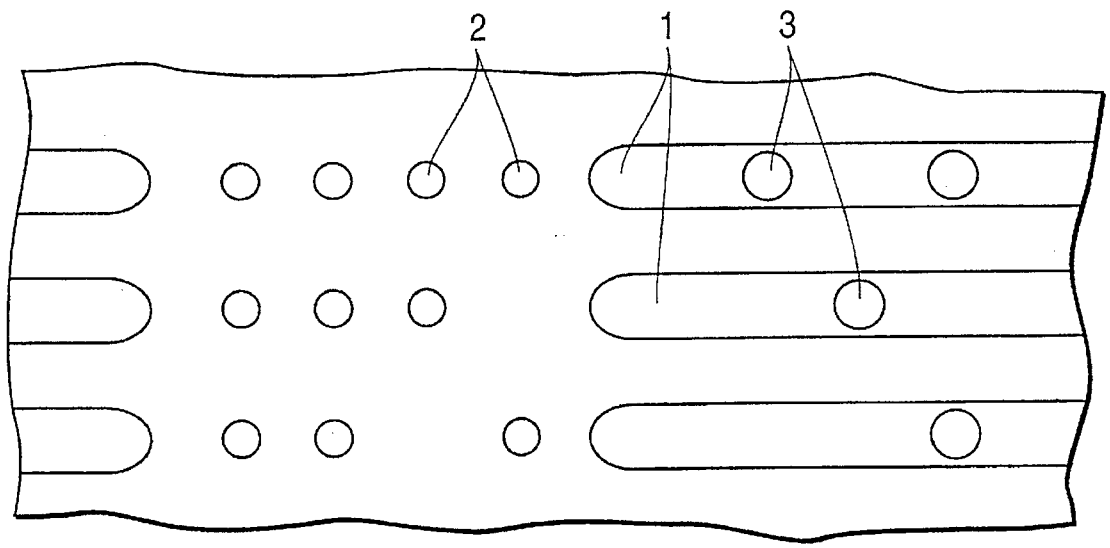
FIG. 6 is a schematic diagram showing a conventional groove-type preformat of optical disks.
Figure 7:
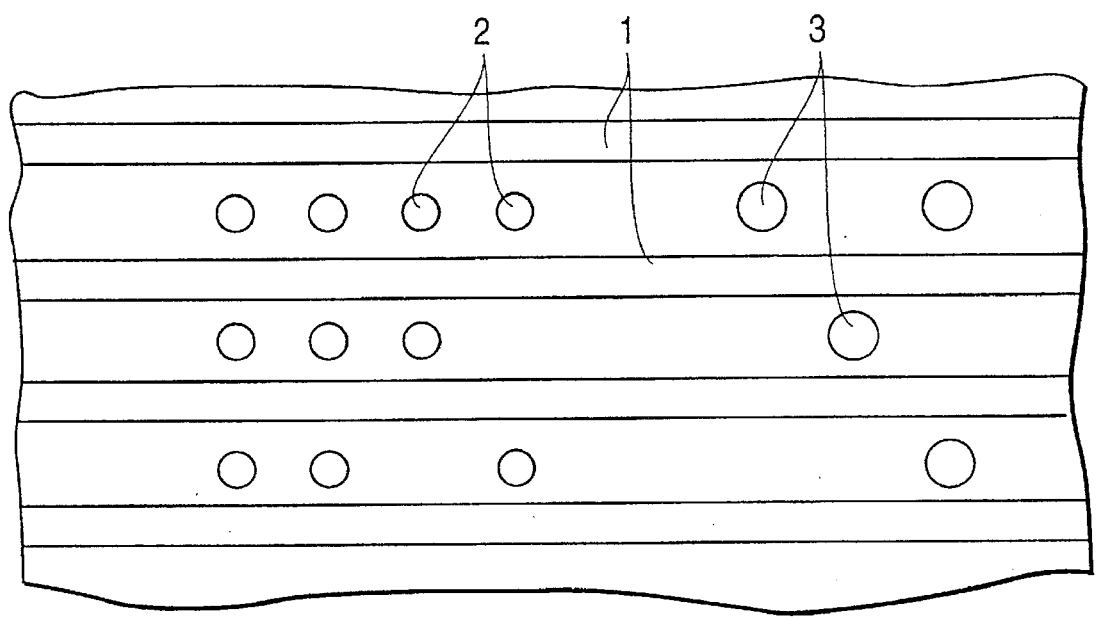
FIG. 7 is a schematic diagram showing a conventional land-type preformat of optical disks.

In the same way, as seen from FIGS. 4a and 4b, the influence of the prepits 14 on the tracking error signals does not depend upon the depth of the guide track 12, but it is constant. Also, as seen from FIGS. 5a and 5b, only at the times when the width x of each of the prepits 14 is narrower than the width Wg of the guide track 12, the prepits 14 have no influence on the tracking error signals.

As mentioned above, the invention provides a preformat of optical disks in which tracking error signals are distinctly output without influence from the prepits in the position of the optical disk on which the prepits 14 are formed. Moreover, the the prepits 14 influence on the tracking error signals has a tendency to be constant regardless of the depth of the groove of each of the guide tracks 12. According to this invention, because the depth of the groove of each of the guide tracks 12 can be equal to that of the groove of each of the prepits 14, it is unnecessary that the depth of the groove of each of the prepits 14 of the preformat of this invention be set to ¼ times the wavelength of laser light, and accordingly the preformat of this invention can be readily manufactured.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An optical memory disk medium comprising:
   a plurality of guide groove tracks arranged parallel to one another for controlling a position of a light beam, a width of a land region between the guide groove tracks being wider than a width of each of the guide groove tracks in the disc-radial direction;
   prepits for providing addressing information for said guide groove tracks;
   said prepits being formed on the land regions interposed between lateral edges, in the disc-radial direction of adjacent parallel guide groove tracks, each prepit having a width, said width of said prepits having a narrower dimension than the width of each guide groove track in the disc-radial direction;
   recorded data pits located on said land regions; and
   the guide groove tracks are free of data pits.

2. The optical memory medium as claimed in claim 1, wherein each prepit has a depth, said depth of each prepit being different from a depth of each guide groove track.

3. An optical memory disc element comprising:
   a substrate having a plurality of guide track grooves and address signal pits formed in said substrate, said address signal pits having a width narrower than a width of said guide track grooves in a disc-radial direction, said address signal pits being formed on land regions interposed between lateral edges, in the disc-radial direction of parallel adjacent guide track grooves;
   a recording layer formed on said substrate, wherein address information and tracking signal information are simultaneously read-out by detecting variations in intensity of light beams reflected from said address signal pits and from said guide tracks,
   said width of said guide track grooves being formed wider than said width of said address signal pits in a disc-radial direction so that a variation in the tracking signal caused by influence of the light intensity of the reflected light beam from said address signal pits is substantially eliminated;
   recorded data pits located on said lands; and
   the guide groove tracks are free of data pits.

4. The optical memory element as claimed in claim 3, wherein each address signal pit has a depth, said depth of each address signal pit being equal to a depth of each guide track.

5. The optical memory element as claimed in claim 3 wherein each address signal pit has a depth, said depth of each address signal pit being different from a depth of each guide track.

6. An optical memory disk medium comprising:
   a plurality of guide groove tracks arranged parallel to one another for controlling a position of a light beam, a width of a land region between the guide groove tracks being wider than a width of each of the guide groove tracks in the disc-radial direction;
   prepits for providing addressing information for said guide groove tracks;
   said prepits being formed on the land regions interposed between lateral edges, in the disc-radial direction of adjacent parallel guide groove tracks, each prepit having a width, said width of said prepits having a narrower dimension than the width of each guide groove track in the disc-radial direction, wherein each prepit has a depth, said depth of each prepit being equal to a depth of each guide groove track;
   recorded data its located on said land regions; and
   the guide groove tracks are free of data pits.

7. An optical memory disc medium comprising:
   a plurality of guide groove tracks arranged parallel to one another for controlling a position of a light beam, a width of a land region between the guide groove tracks being wider than a width of each of the guide groove tracks in the disc-radial direction;
   prepits for providing addressing information for said guide groove tracks;
   said prepits being formed on the land regions interposed between lateral edges, in the disc-radial direction of adjacent parallel guide groove tracks, each prepit having a width, said width of said prepits having a narrower dimension than the width of each guide groove track in the disc-radial direction, wherein the depth of each prepit is set to be equal to or less than ¼ times the wavelength of the light beam;
   recorded data pits located on said land region; and
   the guide groove tracks are free of data pits.

8. The optical memory disc medium of claim 7, wherein each of said prepits has a depth equal to 90 nm.

9. The optical memory disc medium of claim 7, wherein each of said prepits has a depth less than 90 nm.

10. The optical memory disc medium of claim 7, wherein the depth of each of the prepits is equal to the depth of each of said guide groove tracks.

11. The optical memory disc medium of claim 7, wherein the depth of each of the prepits is different than the depth of each of said guide groove tracks.

12. A magneto-optical memory disc medium comprising:
   a plurality of guide groove tracks arranged parallel to one another for controlling a position of a light beam, a width of a land region between the guide groove tracks being wider than a width of each of the guide groove tracks in the disc-radial direction;
   prepits for providing addressing information for said guide groove tracks;
   said prepits being formed on the land regions interposed between lateral edges, in the disc-radial direction of adjacent parallel guide groove tracks, each prepit having a width, said width of said prepits having a narrower dimension than the width of each guide groove track in the disc-radial direction;
   recorded data pits located on said land region, and
   the guide groove tracks are free of data pits.

13. The magneto-optical memory disc medium as claimed in claim 12, wherein each prepit has a depth, said depth of each prepit being equal to a depth of each guide groove track.

14. The magneto-optical memory disc medium as claimed in claim 12, wherein each prepit has a depth, said depth of each prepit being different from a depth of each guide groove track.

15. An optical memory disc medium comprising:

a plurality of guide groove tracks arranged parallel to one another for controlling a position of a light beam, a width of a land region between the guide groove tracks being wider than a width of each of the guide groove tracks in the disc-radial direction; and prepits for providing addressing information for said guide groove tracks;

said prepits being formed on the land regions interposed between lateral edges, in the disc-radial direction of adjacent parallel guide groove tracks, each prepit having a width, said width of said prepits having a narrower dimension than the width of each guide groove track in the disc-radial direction, wherein the depth of each prepit is set to be equal to ¼ times the wavelength of the light beam;

recorded data pits located on said land region; and the guide groove tracks are free of data pits.

* * * * *